United States Patent
Marston et al.

(10) Patent No.: US 9,068,247 B2
(45) Date of Patent: Jun. 30, 2015

(54) NICKEL AND COBALT RECOVERY USING CONTINUOUS ION EXCHANGE

(71) Applicants: Charles R. Marston, Midland, MI (US); Christopher R. Eicher, Midland, MI (US)

(72) Inventors: Charles R. Marston, Midland, MI (US); Christopher R. Eicher, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/241,746

(22) PCT Filed: Apr. 23, 2013

(86) PCT No.: PCT/US2013/037673
§ 371 (c)(1),
(2) Date: Feb. 27, 2014

(87) PCT Pub. No.: WO2013/165735
PCT Pub. Date: Nov. 7, 2013

(65) Prior Publication Data
US 2015/0096412 A1 Apr. 9, 2015

Related U.S. Application Data

(60) Provisional application No. 61/640,925, filed on May 1, 2012.

(51) Int. Cl.
*C22B 3/42* (2006.01)
*C22B 23/00* (2006.01)
(Continued)

(52) U.S. Cl.
CPC .............. *C22B 23/043* (2013.01); *C25C 1/08* (2013.01); *C22B 3/08* (2013.01); *C22B 23/0461* (2013.01); *C22B 23/0453* (2013.01); *C22B 23/0484* (2013.01)

(58) Field of Classification Search
CPC .. C22B 3/42; C22B 23/0461; C22B 23/0453; C22B 23/0484
See application file for complete search history.

(56) References Cited

U.S. PATENT DOCUMENTS 4,083,915 A * 4/1978 Hubred et al. .................. 423/24
4,312,838 A 1/1982 Yan
(Continued)

FOREIGN PATENT DOCUMENTS

AU 699127 11/1998
AU 705253 5/1999
(Continued)

OTHER PUBLICATIONS

Rankin, W. J. Minerals, Metals and Sustainability: Meeting Future Material Needs. 2011. pp. 170-172. Web Jan. 23, 2015.*
(Continued)

*Primary Examiner* — George Wyszomierski
*Assistant Examiner* — Tima M McGuthry Banks
(74) *Attorney, Agent, or Firm* — Edward W. Black

(57) ABSTRACT

A method for recovering nickel and cobalt from a PLS:
  (a) passing the PLS through an ion exchange bed to load nickel onto the ion exchange resin and produce a cobalt-containing raffinate solution,
  (b) passing sulfuric acid through the loaded bed to strip nickel from the resin and produce a nickel-containing eluate,
  (c) rinsing the stripped ion exchange bed,
  (d) adjusting the pH of the cobalt-containing raffinate solution to a pH of at least 2.3,
  (e) passing the cobalt-containing raffinate solution through an ion exchange bed to pre-load cobalt on the ion exchange resin,
  (f) repeating step (a) though (e) until the cobalt concentration of the cobalt-containing raffinate solution increases to >2× of the PLS,
  (g) removing a portion of the cobalt-containing raffinate solution of step (d) from the nickel recovery circuit, and
  (h) passing a portion of the cobalt-containing raffinate solution from step (d) to step (e).

8 Claims, 2 Drawing Sheets

(51) Int. Cl.
 *C22B 3/00* (2006.01)
 *C25C 1/08* (2006.01)
 *C22B 3/08* (2006.01)

(56) References Cited

U.S. PATENT DOCUMENTS

| | | | |
|---|---|---|---|
| 4,316,800 | A | 2/1982 | Stana et al. |
| 4,410,497 | A | 10/1983 | Otto, Jr. |
| 6,350,420 | B1 | 2/2002 | Duyvesteyn et al. |
| 6,524,367 | B1 | 2/2003 | Castellanos Suarez et al. |
| 7,594,951 | B2 | 9/2009 | Rossiter |
| 7,597,738 | B2 | 10/2009 | Liu et al. |
| 2001/0001650 | A1 | 5/2001 | Duyvesteyn et al. |
| 2006/0024224 | A1 | 2/2006 | Neudorf et al. |
| 2007/0297960 | A1 | 12/2007 | Krebs |
| 2008/0011126 | A1* | 1/2008 | Duarte et al. .............. 75/430 |
| 2008/0289448 | A1 | 11/2008 | Costa et al. |
| 2009/0056501 | A1 | 3/2009 | Mendes |
| 2009/0056502 | A1 | 3/2009 | Mendes et al. |
| 2011/0030508 | A1 | 2/2011 | Dreisinger et al. |
| 2011/0194999 | A1 | 8/2011 | Nebeker |
| 2011/0195000 | A1 | 8/2011 | Nebeker et al. |
| 2011/0290077 | A1 | 12/2011 | Marston et al. |
| 2013/0104700 | A1 | 5/2013 | Gisch et al. |

FOREIGN PATENT DOCUMENTS

| | | |
|---|---|---|
| AU | 757360 | 2/2003 |
| EP | 862659 | 9/1998 |
| EP | 1159461 | 12/2001 |
| WO | 9620291 | 7/1996 |
| WO | 2013165735 | 11/2013 |
| WO | 2014031382 | 2/2014 |

OTHER PUBLICATIONS

Kenjo, Tadao, and Takuji Ito. "A Relation between Ion-exchange Selectivity Coefficient and Degree of Distribution for Model Compounds in Solvent Extraction." Bulletin of the Chemical Society of Japan, vol. 41. pp. 1757-1760. 1968. Web. Jan. 23, 2015.*

Dr. Charles Marston Ph.D. and Matthew Rodgers M.A. Nickel Recovery From Lateritic Ore in the Presence of Ferric Iron Using Bispicolylamine Chelating Resin, COM 2009, Hydrometallurgy of Nickel and Cobalt 2009, Sudbury ON.

Grinstead, Selective Absorption of Copper, Nickel, Cobalt and Other Transition Metals ions from Sulfuric Acid Solutions with the Chelating Ion Exchange Resin XFS 4195, Hydrometallurgy, 12 (1984) 387-400, Elsevier Science Publishers B.V., Amsterdam.

Bailey, C., Harris, G.B., Kuyvenhoven R., and Du Plessis, J.; Removal of Nickel from Cobalt Sulphate Electrolyte using ISEP® Continuous Ion Exchange, presented at the Copper Cobalt Nickel and Zinc Recovery Conference, SAIMM, Victoria Falls, Zimbabwe, Jul. 16-18, 2001.

* cited by examiner

NICKEL AND COBALT RECOVERY USING CONTINUOUS ION EXCHANGE

FIELD

The present invention is directed toward a continuous ion exchange process for recovering nickel and cobalt from a product liquor solution.

INTRODUCTION

Continuous ion exchange (CIX) processes are used to recover both nickel and cobalt from product liquor solutions (PLS), see for example WO 1996/20291 and C. Bailey et al., Removal of Nickel From Cobalt Sulphate Electrolyte Using ISEP™ Continuous Ion Exchange. In general, CIX processes involve the use a nickel recovery circuit including of a plurality of ion exchange beds, commonly arranged in a carousal, which repetitively cycle through individual process zones including: nickel loading, nickel elution and rinsing. Cobalt-containing raffinate generated from the process is removed from the nickel recovery circuit and is independently processed, such as by way of an independent ion exchange circuit. This second ion exchange circuit almost doubles the cost of ore processing and may not be economically justified given the low quantities of cobalt recovered. Similar ion exchange processes are described in U.S. Pat. No. 7,597,738.

SUMMARY

The present invention includes a method for recovering nickel and cobalt from a product liquor solution by processing the product liquor solution through a continuous ion exchange process including a plurality of ion exchange beds that pass through individual process zones as part of a nickel recovery circuit, wherein the method includes the following steps:
 (a) passing the product liquor solution through an ion exchange bed to load nickel onto the ion exchange resin and produce a cobalt-containing raffinate solution,
 (b) passing a sulfuric acid solution through the loaded ion exchange bed to strip nickel from the ion exchange resin and produce a nickel-containing eluate,
 (c) passing a rinse solution through the stripped ion exchange bed,
 (d) adjusting the pH of the cobalt-containing raffinate solution to a pH of at least 2.3,
 (e) passing the cobalt-containing raffinate solution through an ion exchange bed to pre-load cobalt on the ion exchange resin,
 (f) repeating step (a) though (e) until the cobalt concentration of the cobalt-containing raffinate solution increases to at least twice that of the product liquor solution, and
 (g) removing a first portion of the cobalt-containing raffinate solution of step (d) from the nickel recovery circuit for subsequent cobalt recovery, and
 (h) passing a second portion of the cobalt-containing raffinate solution from step (d) to step (e).

The subject method produces a concentrated cobalt-containing solution that can be cost effectively processed to obtain commercially valuable cobalt.

DETAILED DESCRIPTION

The present invention includes a method for recovering nickel and cobalt from a product liquor solution (PLS). The source of the PLS is not particularly limited but is typically produced by heap leaching, vat leaching or pressure leaching lateritic ores. The PLS may be subject to a variety of preliminary and post treatment steps including the removal of solids, certain metals (e.g. copper, iron, magnesium) and acid soluble impurities along with nickel and cobalt recovery steps, e.g. electro-wining, precipitation, crystallization, etc. Just prior to treatment with continuous ion exchange (CIX), the PLS preferably has a pH of less than 2.3 (e.g. 1.3 to 2.2). The PLS generally includes a sulfuric acid solution including nickel, cobalt and acid soluble impurities.

Figure 1:
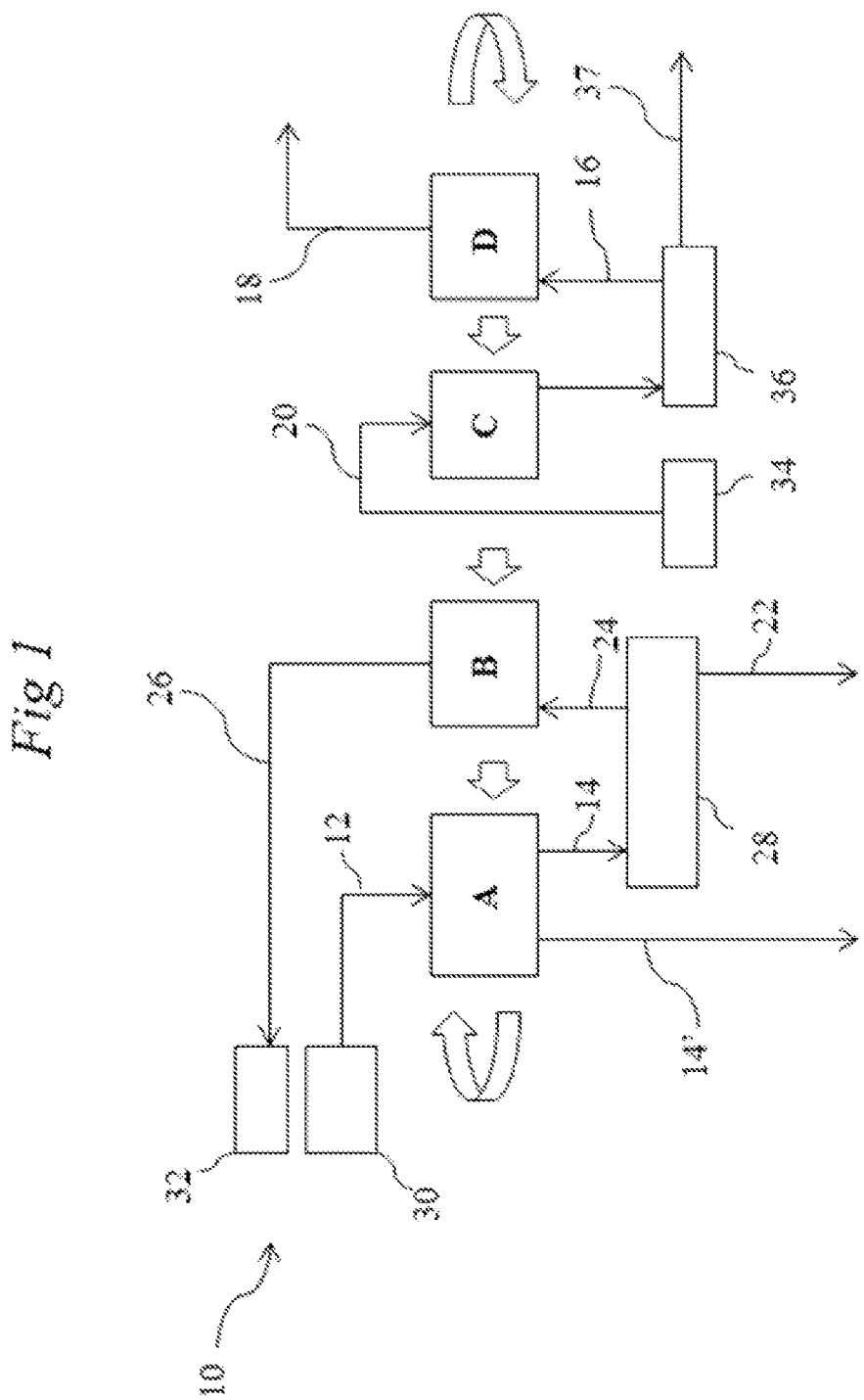
FIG. 1 is schematic view of an embodiment the subject process.

FIG. 1 is a schematic overview of a CIX system adapted for use in the present method. The system includes a plurality of ion exchange beds containing nickel selective ion exchange resin (e.g. DOWEX™ M4195) that sequentially pass through individual process zones (A, B, C, D) as part of a nickel recovery circuit (10). Each zone preferably includes at least one ion exchange bed or column, and in practice may include a plurality of individual beds (as described with reference to FIG. 2). The method includes the following sequential steps:
 (a) passing the PLS (12) through an ion exchange bed (zone A) to load nickel onto the ion exchange resin and produce a cobalt-containing raffinate solution (14, 14'),
 (b) passing a sulfuric acid solution (16) through the loaded ion exchange bed (zone D) to strip nickel from the ion exchange resin and produce a nickel-containing eluate (18),
 (c) passing a rinse solution (20) through the stripped ion exchange bed (zone C),
 (d) adjusting the pH of the cobalt-containing raffinate solution (14) to a pH of at least 2.3 and preferably at least 2.5, e.g. 2.5 to 3.5,
 (e) passing the cobalt-containing raffinate solution (24) through an ion exchange bed (zone B) to pre-load cobalt on the ion exchange resin and generate a general raffinate (26),
 (f) repeating step (a) though (e) until the cobalt concentration of the cobalt-containing raffinate solution (14) increases to at least twice (and more preferably at least 5×) that of the product liquor solution, and
 (g) removing a first portion (22) of the cobalt-containing raffinate solution of step (d) from the nickel recovery circuit (10) for subsequent cobalt recovery, and
 (h) passing a second portion (24) of the cobalt-containing raffinate solution (14) from step (d) to step (e).

Step (d) is preferably performed within a reflux tank (28) such that base (e.g. magnesium hydroxide) can be combined with cobalt-containing raffinate solution (14) to adjust the pH to at least 2.3 and preferably to 2.5 to 3.5.

In step (f), the concentration of the cobalt-containing raffinate solution (24) is preferably maintained below the capacity (i.e. break through pt.) of the ion exchange bed operating in zone B.

In step (g), the total molar quantity of cobalt removed from the nickel recovery circuit is preferably within 25% and more preferably with 10% of the total molar quantity of cobalt introduced into the nickel recovery circuit in step (a). In another preferred embodiment, the molar quantity of cobalt removed from the nickel recovery circuit in step (g) is approximately equal (e.g. in steady state) to the cobalt within the product liquor solution introduced into the nickel recovery circuit in step (a).

In step (h), a reducing agent (sodium sulfite, sodium bi-sulfite, sodium meta-sulfite, sodium dithionite) may optionally be added to the cobalt-containing raffinate solution from step (d) prior to step (e). The addition of a reducing agent reduces the precipitation of iron ions that may be present.

PLS, raffinate, rinse solution (e.g. water), nickel elution solution (e.g. 20% sulfuric acid) are maintained in tanks, 30, 32, 34 and 36 respectively. The tanks are in selective fluid communication with the ion exchange beds. Fluid flow is controlled by a plurality of values and a control panel (not shown) as the beds cycle through the individual process zones (A, B, C and D). CIX equipment for performing the subject method is available from PuriTech (e.g. IONEX™), Ionex Separations and Calgon Carbon (e.g. ISEP™)

The cobalt-containing raffinate solution (22) removed from the nickel recovery circuit in step (g) may be further processed by at least one of the following techniques to recover cobalt: solvent extraction, neutralization-precipitation, electro-winning, crystallization, membrane dehydration and ion exchange. For example, in one embodiment the cobalt-containing raffinate solution (22) removed from the nickel recovery circuit in step (g) is directed through a continuous ion exchange process comprising a plurality of ion exchange beds containing cobalt selective ion exchange resin that pass through individual process zones as part of a cobalt recovery circuit including: passing cobalt-containing raffinate solution through an ion exchange bed to load cobalt onto the ion exchange resin, and subsequently passing a sulfuric acid solution through the loaded ion exchange bed to strip cobalt from the ion exchange resin and produce a cobalt-containing eluate. Similarly, the nickel-containing eluate (18) may be further processed by a variety of known techniques, e.g. solvent extraction, neutralization-precipitation, electro-winning.

A suitable nickel and cobalt selective ion exchange resin for use in the present invention includes DOWEX™ M4195 and XUS-43578 chelating resins available from The Dow Chemical Company. This resins comprise a styrene-divinyl-benzene copolymer matrix with bis-picolylamine functional groups.

Figure 2:
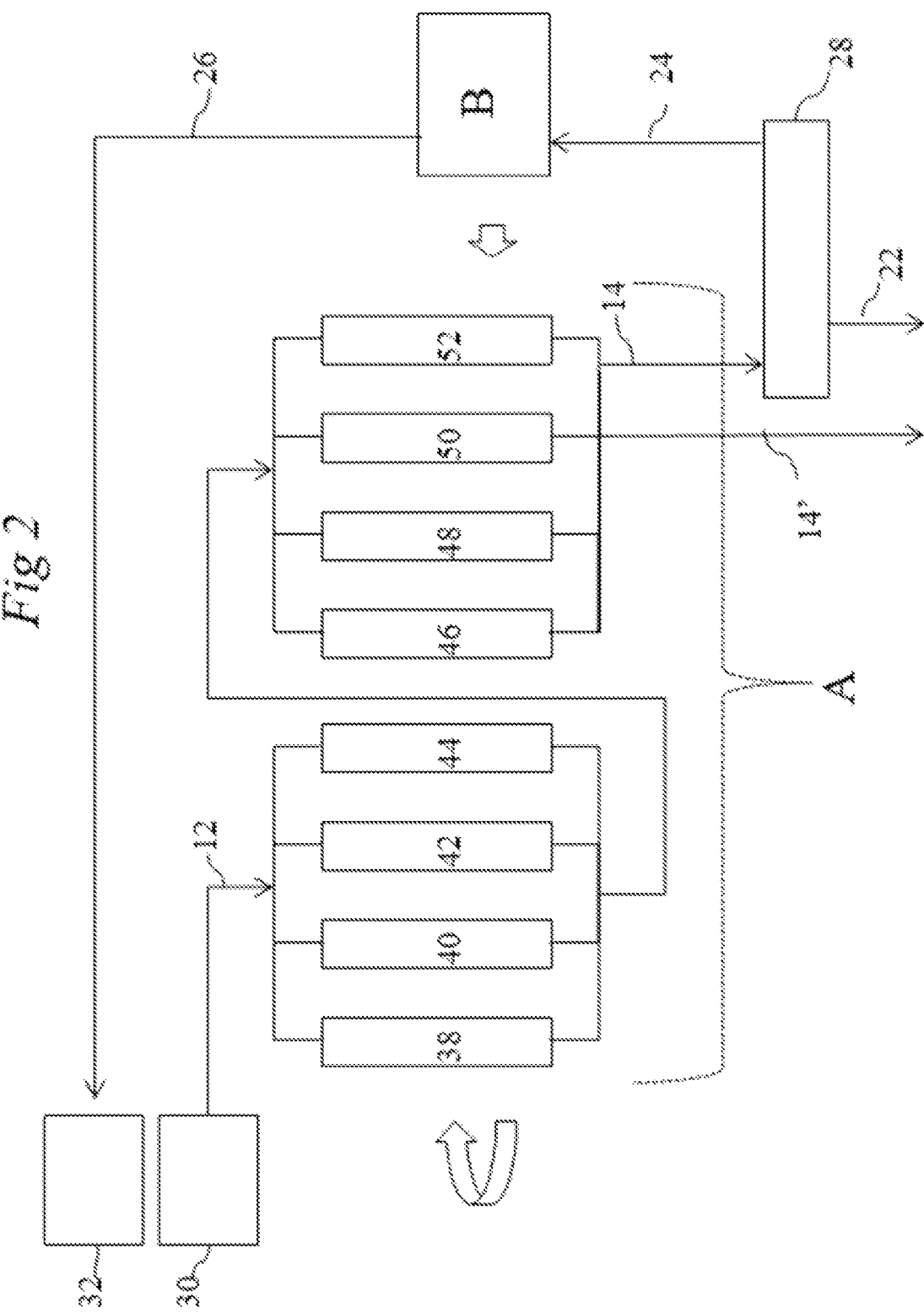
FIG. 2 is a schematic view of a selection portion of an embodiment of the subject process.

An alternative embodiment of the subject process is illustrated in FIG. 2 wherein zones C and D are not shown but where like numerals have been used as FIG. 1. Zone A comprises 8 ion exchange beds, with beds 38-44 connected in parallel with their collective output directed to a second parallel bed arrangement including beds 46-52.

In one preferred embodiment illustrated in both FIGS. 1 and 2, a portion of the cobalt-containing raffinate solution (14') is directly removed from an ion exchange bed (bed 50 in FIG. 2) and is subject to subsequent cobalt recovery without use of a reflux tank (28). In this embodiment, the cobalt-containing raffinate solution (14') preferably meets the same criteria as that of the cobalt-containing raffinate solution (14) directed to the reflux tank (28), e.g. the total molar quantity of cobalt removed from the nickel recovery circuit is preferably within 25%, and more preferably within 10% of the total molar quantity of cobalt introduced into the nickel recovery circuit in step (a). In another preferred embodiment, the molar quantity of cobalt removed from the nickel recovery circuit is approximately equal to the cobalt within the product liquor solution introduced into the nickel recovery circuit in step (a).

Embodiments of the present invention generate a more concentrated cobalt-containing raffinate which allows for much more cost effective cobalt recovery. For example, the quantity of ion exchange resin required to process such a concentrated cobalt solution is significantly less than that associated to the total volume of PLS.

EXAMPLES

A continuous ion exchange (CIX) system was constructed in general accordance with FIG. 1 using twenty-four individual ion exchange columns arranged in a standard carrousel design with each column having a 1.5 inch inner diameter packed with 1 liter of bis-picolylamine chelating resin (XUS-43578) obtained from The Dow Chemical Company. An outlet (14') was not employed. All metal analysis was performed on a portable XRF unit (Innov-X Systems Model 5000) on undiluted process samples. The "resin advance rate" of the system was set to 7 minutes per forward step of the CIX carrousel. Adsorption Zone A comprised two sets of four parallel columns in series followed by two sets of two parallel columns in series (12 columns; 4×4×2×2) Adsorption Zone B comprised one set of three parallel columns followed in series by two columns in parallel (5 columns; 3×2). Zone C comprised 2 columns in series for eluate entrainment rejection (ER), and three columns in series for nickel elution. Zone D comprised two columns in series for feed ER. The system was operated in a steady state condition where the feed stock comprised 35 g/L magnesium sulfate, 4.95 g/L nickel (from $Ni(SO_4)$), and 330 mg/L cobalt (from $Co(SO_4)$). The feed stock was at pH 1.5 and the temperature of the feed and the system was 45° C.

The pH of an agitated interstage tank (22) was controlled between 2.3 and 3.2 by steady mechanical addition of magnesium hydroxide in powder form. The system was operated at slip (22) to feed (12) ratio (Slip Rate) of 15%. Tank (36) was acidified with 20% sulfuric acid at a rate of 0.63 BV/step. Water supplied from tank (34) via line (20) at a rate of 0.7 BV/Step was employed for the eluate ER, pushing acid and nickel eluate "back" to tank (36) and preparing the resin to enter the adsorption stages. Similarly, nickel eluate from tank (36) was employed in the ER of feed via line (16) at a flow rate of 0.7 BV/step. The produced nickel eluate (37) was generated at a rate of 0.63 BV/step. Results of the testing are summarized in Table 1 provided below. In this Example, the process raffinate (barren) was almost void of both cobalt and nickel while essentially all of the nickel reported to the nickel eluate (37) at about 7.8 times the initial feed concentration and nearly all of the cobalt reported to the slip (22) at a concentration about 6 times the original feed cobalt concentration.

TABLE 1

|  | FIG. 1 Reference | Flow Rate (ml/min) | Nickel (mg/ml) | Cobalt (mg/ml) |
| --- | --- | --- | --- | --- |
| Feed | 12 | 751 | 4950 | 330 |
| Slip | 22 | 111 | 269 | 2000 |
| Raffinate | 26 | 640 | 50 | 19 |
| Ni Eluate | 37 | 89 | 38500 | 56 |

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. Stated ranges include end points. The entire subject matter of each of the aforementioned patent documents is incorporated herein by reference.

The invention claimed is:

1. A method for recovering nickel and cobalt from a product liquor solution by processing the product liquor solution through a continuous ion exchange process comprising a plurality of ion exchange beds containing nickel selective ion exchange resin that pass through individual process zones as part of a nickel recovery circuit, wherein the method comprises the following steps:
   (a) passing the product liquor solution through an ion exchange bed to load nickel onto the ion exchange resin and produce a cobalt-containing raffinate solution having a concentration of cobalt defined by a molar quantity, and a nickel loaded ion exchange bed,
   (b) passing a sulfuric acid solution through the nickel loaded ion exchange bed to strip nickel from the ion exchange resin and produce a nickel-containing eluate and a stripped ion exchange bed,
   (c) passing a rinse solution through the stripped ion exchange bed,
   (d) adjusting the cobalt-containing raffinate solution to a pH of at least 2.3,
   (e) passing the cobalt-containing raffinate solution through an ion exchange bed to pre-load cobalt on the ion exchange resin,
   (f) repeating step (a) though (e) until the cobalt concentration of the cobalt-containing raffinate solution increases to at least twice that of the product liquor solution, and
   (g) removing a first portion of the cobalt-containing raffinate solution of step (d) from the nickel recovery circuit for subsequent cobalt recovery wherein the cobalt-containing raffinate solution has a molar quantity of cobalt, and
   (h) passing a second portion of the cobalt-containing raffinate solution from step (d) to step (e).

2. The method of claim 1 wherein the molar quantity of cobalt removed from the nickel recovery circuit in step (g) is within 25% of the molar quantity of cobalt introduced into the nickel recovery circuit in step (a).

3. The method of claim 1 wherein a mass balance of cobalt is removed from the nickel recovery circuit, and the mass balance of cobalt removed from the nickel recovery circuit is approximately equal to the cobalt within the product liquor solution introduced into the nickel recovery circuit.

4. The method of claim 1 wherein the cobalt-containing raffinate solution removed from the nickel recovery circuit in step (g) is further processed by at least one of the following techniques to recover cobalt: solvent extraction, neutralization-precipitation, electro-winning, crystallization, membrane dehydration and ion exchange.

5. The method of claim 1 wherein the cobalt-containing raffinate solution removed from the nickel recovery circuit in step (g) is directed through a continuous ion exchange process comprising a plurality of ion exchange beds containing a cobalt selective ion exchange resin that pass through individual process zones as part of a cobalt recovery circuit including:
   passing cobalt-containing raffinate solution through an ion exchange bed to load cobalt onto the ion exchange resin, and subsequently passing a sulfuric acid solution through the loaded ion exchange bed to strip cobalt from the ion exchange resin and produce a cobalt-containing eluate.

6. The method of claim 1 wherein step (a) comprises passing the product liquor solution through a plurality of ion exchange beds to load nickel onto the ion exchange resin and produce a cobalt-containing raffinate solution, and wherein a portion of the cobalt-containing raffinate solution of step (a) is removed from the nickel recovery circuit for subsequent cobalt recovery.

7. The method of claim 1 wherein step (h) comprises adding a reducing agent to the cobalt-containing raffinate solution from step (d) prior to step (e).

8. The method of claim 1 wherein step (d) includes adjusting the cobalt-Containing raffinate solution to a pH of at least 2.5.

* * * * *